(12) United States Patent
Tatsuno et al.

(10) Patent No.: US 6,721,511 B1
(45) Date of Patent: Apr. 13, 2004

(54) OPTICAL COMMUNICATION EQUIPMENT AND OPTICAL COMMUNICATION NETWORK EQUIPMENT

(75) Inventors: Kimio Tatsuno, Tokyo (JP); Koji Yoshida, Kokubunji (JP); Kazuyuki Fukuda, Chiyoda (JP); Hiroshi Naka, Komoro (JP); Satoru Kikuchi, Saku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/385,418

(22) Filed: Aug. 30, 1999

(30) Foreign Application Priority Data

Oct. 16, 1998 (JP) ............................................. 10-294910

(51) Int. Cl.[7] ............................................... H04B 10/12

(52) U.S. Cl. ........................... 398/141; 385/33; 385/88; 385/93

(58) Field of Search ............................ 398/141; 385/33, 385/35, 88, 89, 93

(56) References Cited

U.S. PATENT DOCUMENTS

| | | | | |
|---|---|---|---|---|
| 5,504,828 A | * | 4/1996 | Cina et al. | 385/33 |
| 5,638,475 A | * | 6/1997 | Gaebe | 385/93 |
| 5,764,838 A | * | 6/1998 | Kubo et al. | 385/93 |
| 5,963,694 A | * | 10/1999 | Fujimura et al. | 385/88 |
| 6,326,600 B1 | * | 12/2001 | Christensen et al. | 250/201.1 |

* cited by examiner

Primary Examiner—John Tweel
(74) Attorney, Agent, or Firm—Antonelli, Terry, Stout & Kraus, LLP

(57) ABSTRACT

An optical communication equipment includes a semiconductor laser element, an image-forming element, an optical fiber and a substrate for mounting the semiconductor laser element, the image-forming element and the optical fiber. An optical output of the semiconductor laser element is adapted to be provided to the optical fiber via the image-forming element. The image-forming element is mounted in a V-groove formed in the substrate and having a substantially "V"-shaped cross-section. A shortest distance between a light spot of the semiconductor laser element and an optical axis of the image-forming element is 1 mm at most and the image-forming element substantially satisfies the sine condition.

27 Claims, 11 Drawing Sheets

OPTICAL COMMUNICATION EQUIPMENT AND OPTICAL COMMUNICATION NETWORK EQUIPMENT

BACKGROUND OF THE INVENTION

The present invention relates to optical communication equipment and network equipment, such as optical communication equipment and network equipment comprising a semiconductor laser element, an optical fiber, an optical detector and an optical system for optically coupling them.

In optical communication equipment which couples an output from a semiconductor laser element to an optical fiber and transmits information to a distant place, it is necessary to couple the output from the semiconductor laser element to the optical fiber as efficiently as possible.

To meet the demands of size reduction and surface mounting in such optical modules, optical components are mounted within a dual in-line type package as in the case of integrated circuits (ICs) and large-scale integrated circuits (LSIs), and then the package is mounted on a circuit board.

Within the package, the optical components and other components are mounted on a Si substrate.

In the optical coupling system, as a coupling lens for coupling light from the semiconductor laser element to the optical fiber, a ball-type spherical lens 1 is used as illustrated in FIG. 1. The ball-type spherical lens is described in "LIGHTWAVE" by J. F. Dormer, p82, February 1998.

SUMMARY OF THE INVENTION

In the conventional ball-type lens, there is a problem that, when its numerical aperture on a semiconductor laser element side is increased for improving optical coupling efficiency, its spherical aberration increases, increase in the spherical aberration degrades a light spot profile on the entrance end of the optical fiber, and consequently decreases its optical coupling efficiency to the optical fiber.

There is another problem with the conventional ball-type lens that, when a light spot of the semiconductor laser element is displaced from the optical axis of the ball-type lens, coma aberration, astigmatism and spherical aberration in a narrow sense occur, and the optical coupling efficiency is made smaller than when the light spot on the optical axis of the ball-type lens.

It is one of the objects of the present invention to solve the above problems. One of features in an embodiment of the present invention is such that an optical component having a better imaging characteristics in place of the ball-type lens is mounted on a Si substrate on which a semiconductor laser element is also mounted. A V-groove having a substantially "V"-shaped cross-section is formed in the Si substrate with unisotropic etching.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

The embodiments of the present invention will be explained by reference to the drawings.

Figure 3A:
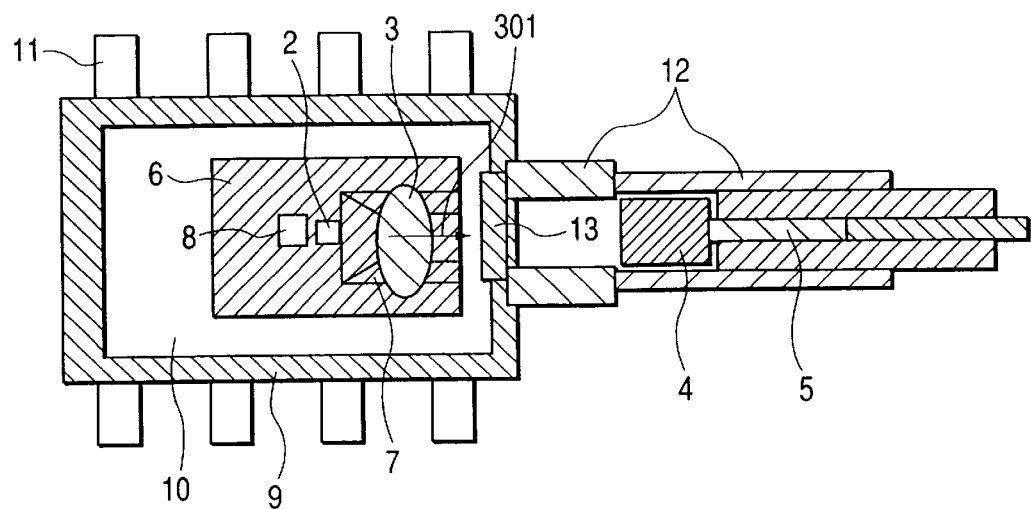
FIGS. 3A and 3B are horizontal and vertical cross-sectional views of an optical module mounting an image-forming element of an embodiment in accordance with the present invention in a V-groove formed in a Si substrate, respectively.
Figure 3B:
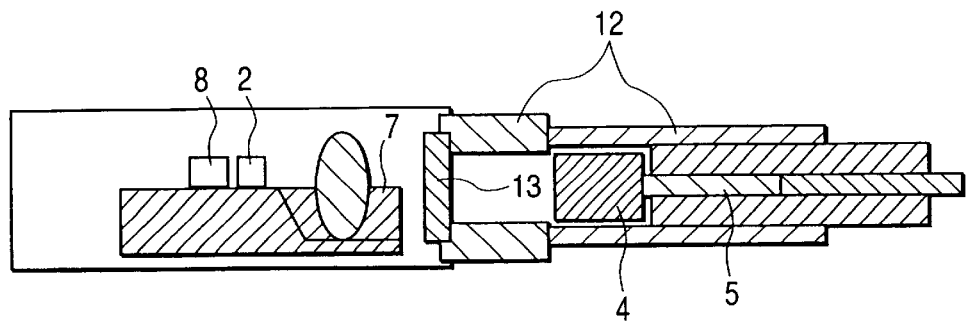

As shown in FIGS. 3A and 3B, an image-forming element 3 is mounted in the V-groove 7 such that the optical axis of the image-forming element 3 is aligned with the longitudinal axis 301 of the V-groove 7. With this construction, the semiconductor laser element 2 and the image forming element 3 are aligned with each other with high accuracy.

There is a limitation to the dimensions of the V-groove when it is required to form the V-groove in the Si substrate with high precision, and it is desirable that a diameter of the image-forming element 3 is in a range of 50 $\mu$m to 2 mm.

It is also desirable that the image-forming element 3 satisfies the sine condition. That means that it is necessary that spherical aberration and coma aberration are eliminated sufficiently in the vicinities of the optical axis of the image-forming element.

A representative image-forming element in the embodiments of the present invention has two aspherical lens surfaces.

Other examples of image-forming elements designed for satisfying the sine condition are diffraction optical elements having diffraction grating, hybrid image-forming element having a lens with diffraction grating formed on the lens, combination lenses comprising a plurality of lenses, and graded index lenses with its refractive index varied in its glass medium.

The following explains the sine condition. Optical communication equipment to which the embodiments of the present invention are directed uses a light source providing a laser beam of a large divergence angle such as a semiconductor laser element.

It is necessary to increase a numerical aperture of a lens for receiving the laser beam for improving the utilization coefficient of light from the semiconductor laser element, and this means the lens needs characteristics similar to those of a objective lens of a microscope.

In designing such image-forming elements, it is desirable that there is a criterion condition available for elimination of coma aberration in the vicinities of the axis of an image-forming element over the while entrance pupil plane. The sine condition is suitable for the criterion, as will be explained in connection with FIGS. 2A and 2B.

Figure 1:
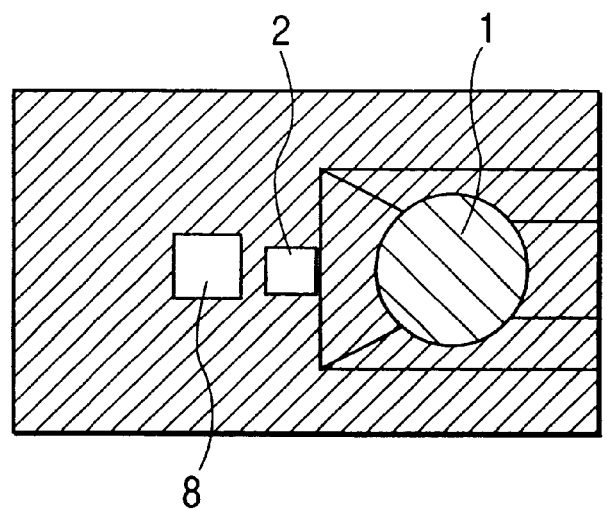
FIG. 1 is a plan view of a prior art module employing a ball type spherical lens for optically coupling a semiconductor laser element.
Figure 2A:
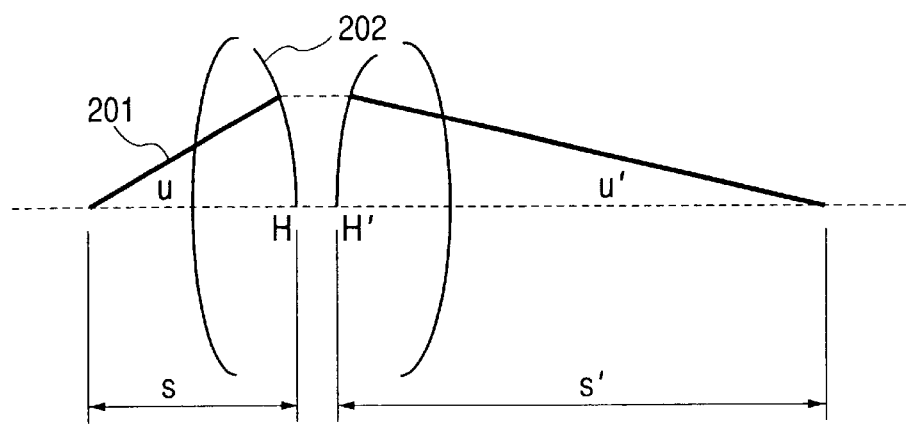
FIGS. 2A and 2B are illustrations for explaining the sine condition.
Figure 2B:
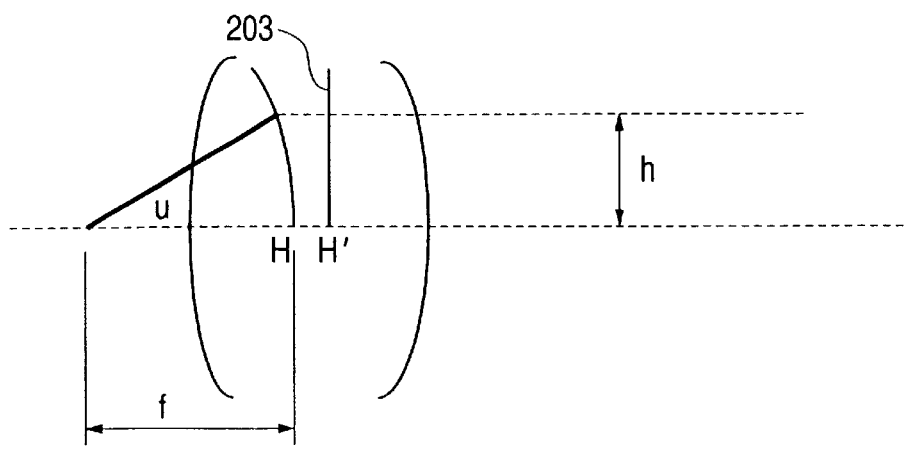

FIGS. 2A and 2B are illustrations for explaining the sine condition when images of a light source are not at infinity and at infinity, respectively.

In FIG. 2A, assume that an arbitrary ray 201 leaves an object on the optical axis at an angle u with respect to the optical axis, and makes an angle u' with respect to the optical axis after passing through the optical system. A condition for eliminating aberrations in the neighborhood of the optical axis, that is, spherical aberration and coma aberration, from the ray 201 under consideration at the same time is that a position where the ray 201 intersects the optical axis in the image space coincides with a paraxial imaging point. In addition to elimination of spherical aberration, the angles u and u' must satisfy a relationship sin u/sin u'=m where m is a paraxial lateral magnification. This is the sine condition, and is an extension of the well-known formula for the paraxial lateral magnification out of the paraxial region. Now assume that the optical system satisfies the sine condition, s is a distance from a principal point H in the object plane to an object point on the axis, and s' is a distance from a principal point H' in the image plane to an image point on the axis. They give m=s'/s=sin u/sin u', and then s sin u=s' sin u'.

This means that, in the optical system satisfying the sine condition, when a principal plane having a lateral magnification of 1 is extended out of the paraxial region, the principal planes 202 are not planar, but spherical with their centers being the object point on the axis and the image point on the axis, respectively.

In a case where the image point on the axis is at infinity as illustrated in FIG. 2B, if a ray travels at a height h in parallel with the optical axis, the relationship f=h/sin u exists. This means the principal plane on the image side is planar, but the principal plane on the object side is spherical.

Also in the optical system for coupling a semiconductor laser element to an optical fiber or an optical waveguide in optical communication equipment, it is possible to obtain the theoretical maximum optical coupling efficiency with large tolerances, only when the sine condition is satisfied.

Next, the aberration of the image-forming element will be studied from a viewpoint different from the sine condition.

When a light beam from a semiconductor laser element is provided to an optical fiber by collecting the light beam by the image-forming element, if aberration of the image-forming element is large, the spot of the collected light beam spreads at the entrance end of the optical fiber and, consequently, this reduces the utilization coefficient of the light to be provided into the optical fiber. And, if a misalignment in the optical axis between the semiconductor laser element and the image-forming element exists, the amount of aberration in the spot of the collected light increases and this reduces the amount of light provided into the optical fiber.

Consequently, it is desirable in image-forming elements for the embodiments of the present invention that a shortest distance between a light spot of the semiconductor laser element and an optical axis of the image-forming element is 2 mm at most in an object space of the image-forming element, and a maximum of wave front aberration in an image of a light spot of the semiconductor laser element caused by the image-forming element is less than half an output wavelength of the semiconductor laser element. By satisfying these conditions, the degradation of a spot of the collected light can be reduced and the decrease in the optical coupling efficiency to the optical fiber can be reduced.

Next, the optical coupling between the semiconductor laser element and the optical fiber or the optical waveguide will be considered. The optical coupling efficiency e between two modes capable of being approximated by a Gaussian mode, such as semiconductor laser elements and optical fibers, is given by $e=4/(NA_1/NA_2+NA_2/NA_1)^2$, where $NA_1$ and $NA_2$ are numerical apertures of the semiconductor laser element and the optical fiber, respectively. The optical coupling efficiency e is maximized when $NA_1=NA_2$.

A feature in the embodiments of the present invention is making the numerical aperture $NA_1$ on the semiconductor laser element side and the numerical aperture $NA_2$ on the optical fiber side equal to each other within manufacturing tolerances.

Usually the divergence angles (full width at half maximum) of the laser beams from the semiconductor laser elements are in a range of 5° to 55° at most, and the high optical coupling efficiency is obtained by setting the numerical aperture of the image-forming element on the semiconductor laser element side within the range of the numerical aperture of the semiconductor laser element, and by setting the numerical aperture of the image-forming element on the optical fiber side within the varying range of the numerical aperture of the optical fiber.

By disposing an optical isolator between the image-forming element and the optical fiber, the plane of polarization of return light to the semiconductor laser element can be rotated by 90° and interference between the original light and the return light can be reduced such that the output of the semiconductor laser element can be stabilized.

FIGS. 3A and 3B are horizontal and vertical cross-sectional views of an optical module mounting an image-forming element of a first embodiment in accordance with the present invention, respectively. A light output from a semiconductor laser element 2 is collected by an image-forming element 3 such as an aspherical lens, and provided to an optical fiber 5 provided with a ferrule via an optical isolator 4.

A divergence angle (full width at half maximum) of a laser beam from the semiconductor laser element 2 is about 30°, and most of the laser beam can be taken in by the image-forming element 3 having a numerical aperture of 0.2 to 0.9 on the object side. A numerical aperture of the optical fiber is usually 0.1 and by setting a numerical aperture of the image-forming element 3 on the optical fiber side to be about 0.1 the two numerical apertures are made equal to each other to provide higher optical coupling efficiency.

The image-forming element 3 is disposed in a V-groove 7 formed in a Si substrate 6, and the semiconductor laser element 2 can be positioned on the same substrate 6, and therefore the image-forming element 3 and the semiconductor laser element 2 can be aligned with each other with accuracy in the order of submicrons.

Since the image-forming element 3 satisfies the sine condition, the amount of wave front aberration can be suppressed to less than half the wavelength even when the object is in the vicinities more than several tens μm away from the optical axis of the lens as well as on the optical axis of the lens, and imaging characteristics is secured to a limit by diffraction at the entrance end of the optical fiber. Magnification by the optical system is two to nine.

A photodetector 8 is attached immediately behind the semiconductor laser element 2 by die bonding and monitors the output of the semiconductor laser element. The Si substrate 6 having these optical components and the image-forming element 3 mounted thereon is affixed and electrically connected to a pad 10 within the package 9. Electrodes on the Si substrate are connected to respective pins 11 by wire bonding.

An optical isolator 4 and a ferrule fiber 5 are contained within a metal tube 12, and the metal tube 12 is affixed with adhesive or welded to the package 9. The package 9 is hermetically sealed with a sealing window 13 and a lid.

With this construction, the optical coupling efficiency between the semiconductor laser element and the optical fiber is improved, limitations on "kink" appearing levels and temperature-dependency of the output are relaxed, production of the optical modules with higher yield is realized, and high reliability, simplification and automation of surface mounting are realized by making the most of Si substrates.

Figure 4:
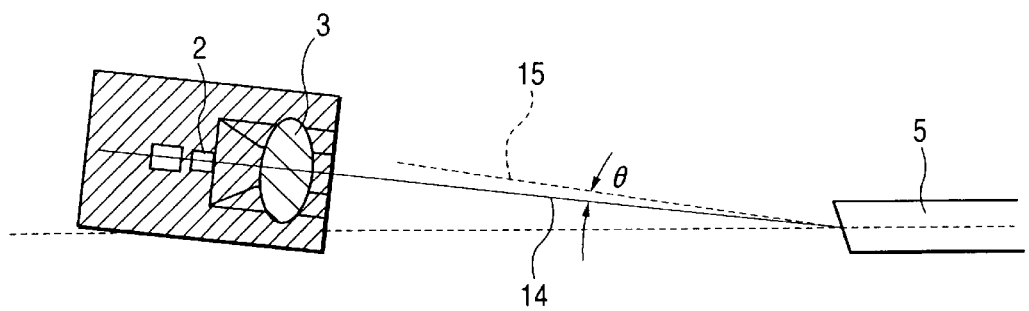
FIG. 4 is a plan view for explaining the arrangement of a Si substrate sub-assembly of an embodiment in accordance with the present invention and an optical fiber.

FIG. 4 is an illustration for explaining a second embodiment of the present invention. FIG. 4 illustrates the arrangement of the semiconductor laser element 2 positioned on the optical axis of the image-forming element 3, a direction 14 of the optical axis of the coupling optical system, and an optical axis 15 of the optical fiber 5 with its end beveled. The direction of the optical axis 14 of the coupling optical system intersects the optical axis 15 of the optical fiber 5 with an angle θ which is larger than 0°, but does not exceed 10° in a major surface of the Si substrate.

The reason why this arrangement is adopted is as follows:

When refraction of light at the end of the fiber 5, an exit angle of the light is calculated by the Snell's law using the refractive indices of the optical fiber and the medium surrounding the end of the optical fiber. The optical coupling efficiency between the laser beam and the optical fiber is maximized when the laser light is entered into the optical fiber at an angle equal to the above exit angle.

The entrance end of the optical fiber is beveled such that light reflected from the end of the optical fiber is prevented from returning to the semiconductor laser element and producing fluctuations in the output of the semiconductor laser element by interference with the original laser light.

By blocking the return light to the semiconductor laser element, this embodiment becomes capable of employing a DFB (distributed feedback) laser which is sensitive to return light and tends to produce large fluctuations in its output, with low fluctuations in its output. Therefore this embodiment provides a great contribution to lengthening of the transmission distance, speed-up, increase of its functions, reduction in size and power saving.

Figure 5A:
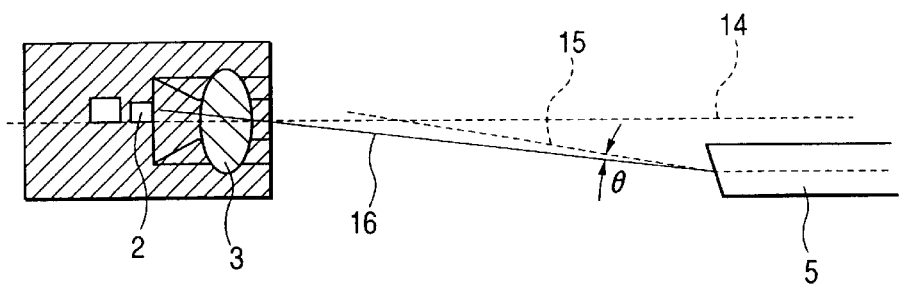
FIGS. 5A and 5B are plan and vertical cross-sectional views of optical communication equipment of another embodiment in accordance with the present invention for explaining the arrangement of a semiconductor laser element, an image-forming element and an optical fiber employed in the optical communication equipment, respectively.
Figure 5B:
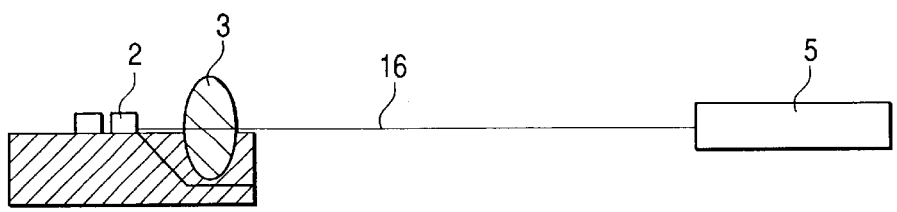

FIGS. 5A and 5B are plan and vertical cross-sectional views of optical communication equipment of a third embodiment in accordance with the present invention.

The light spot of the semiconductor laser element 2 is displaced from the optical axis 14 of the image-forming element 3, a direction of the principal ray 16 connecting the light spot and the center of the lens iris is aligned with the principal ray 15 of the optical fiber 5.

If aberration in the image-forming element can be neglected, the optical coupling is maximized when the principal rays 15 and 15 are aligned accurately with each other. In actual practice, the coupling efficiency to the optical fiber is reduced due to the increase in wave front aberration caused by the displacement of the light spot. Therefore it is desirable that the principal rays 15 and 16 intersect each other at an angle θ which is larger than 0°, but 10° at most, and which is selected depending upon the amount of aberration of the image-forming element.

Figure 6:
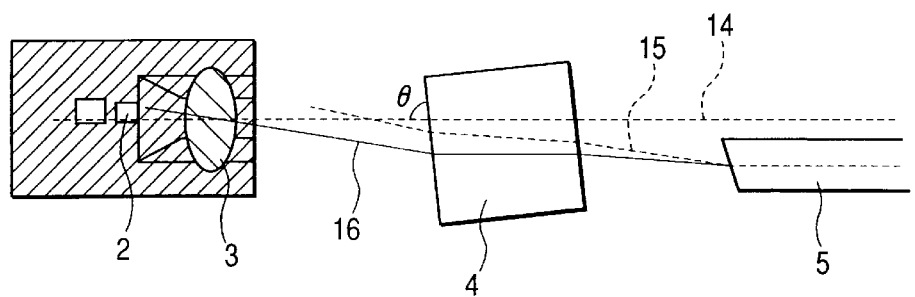
FIG. 6 is a plan view of another embodiment in accordance with the present invention comprising a semiconductor laser element, an image-forming element, an optical isolator and an optical fiber.

FIG. 6 is an illustration for explaining a fourth embodiment of the present invention. An optical isolator 4 is disposed between the image-forming element 3 and the optical fiber 5. The optical isolator 4 rotates a direction of polarization of the light from the semiconductor laser element which has transmitted through it, by an angle of 45°, and rotates a direction of polarization of the light by 45° again when the light is reflected downstream and enters the optical isolator again in the reverse direction.

The direction of polarization of the return light makes an angle of 45° with that of the original light, the original and return lights do not interfere with each other and therefore fluctuations in the output of the semiconductor laser element are reduced.

In FIG. 6, the optical isolator 4 is tilted toward the left side so that light reflected on the end of the optical isolator is prevented from returning to the semiconductor laser element 2. When the optical isolator 4 is tilted toward the left side, not toward the right side, the image of the light spot formed by the image-forming element 3 is shifted upward in FIG. 6 and is made nearer to the optical axis 14, therefore aberration is reduced, quality of the image is improved, and higher optical coupling efficiency to the optical fiber is obtained.

Figure 7:
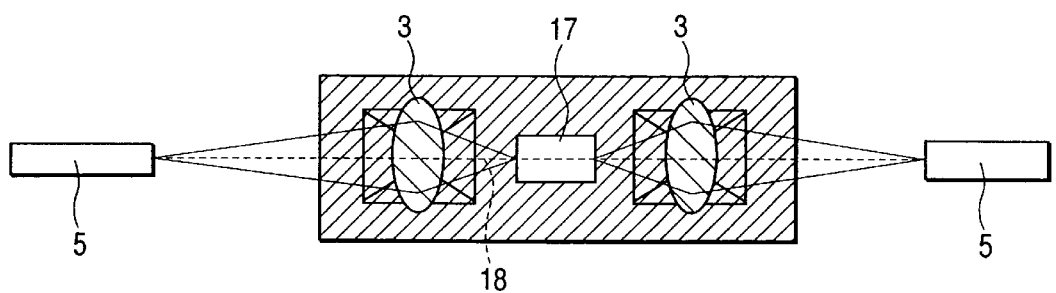
FIG. 7 is a plan view of another embodiment in accordance with the present invention comprising optical fibers, image-forming elements, an optical modulator and a Si substrate.

FIG. 7 is an illustration for explaining a fifth embodiment of the present invention. The light from the optical fiber 5 at the left-hand of FIG. 7 is provided to the image-forming element 3 such as an aspherical lens, and then is provided to a semiconductor optical modulator 17 where the light is high frequency-modulated. The high frequency-modulated light emitted from the semiconductor optical modulator 17 is collected by the image-forming element 3 and is coupled to a second optical fiber 5 at the right-hand of FIG. 7. The two image-forming elements 3,3 are mounted in the V-groove formed in the Si substrate and the optical modulator 17 is aligned with the center line 18 of the V-groove and affixed to the substrate by die bonding.

In place of the optical modulator 17, this embodiment can employ a semiconductor optical amplifier, an optical switch, a photo detector, various kinds of optical devices for wavelength-division multiplexing or an optical element for add and drop.

Figure 8:
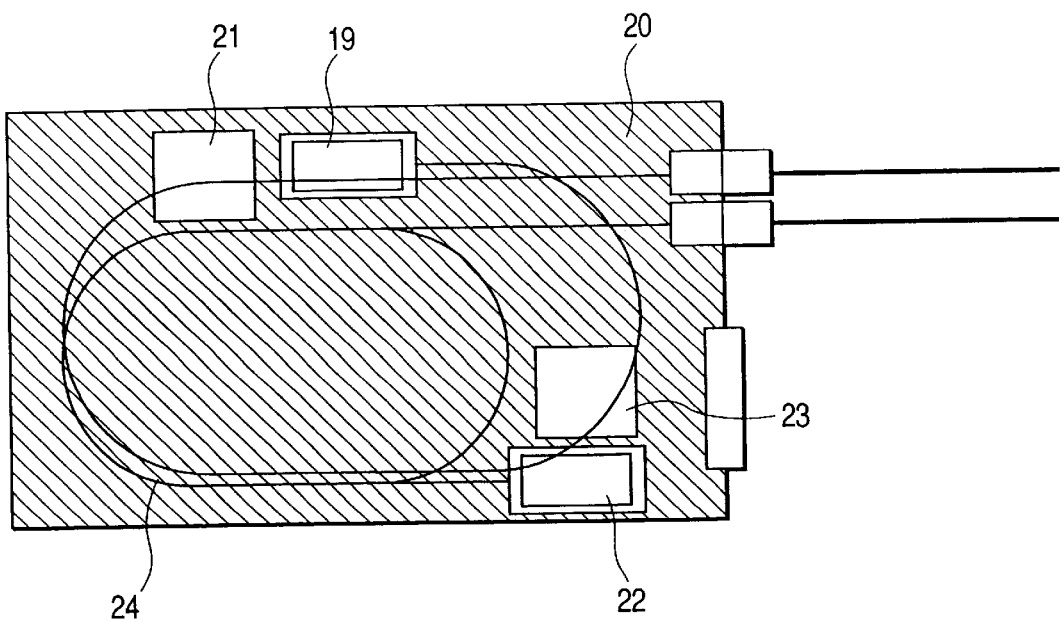
FIG. 8 is an illustration of an optical module of an embodiment in accordance with the present invention mounted on a circuit board.

FIG. 8 is an illustration for explaining a sixth embodiment of the present invention. The optical module 19 having incorporated therein the optical devices of the above embodiments is mounted on the circuit board 20 together with an LSI 21 for a semiconductor laser element driver circuit, a receiver 22, an amplifier 23 for the receiver. In this embodiment, a fiber pigtail 24 is mounted on the circuit board 20.

Figure 9A:
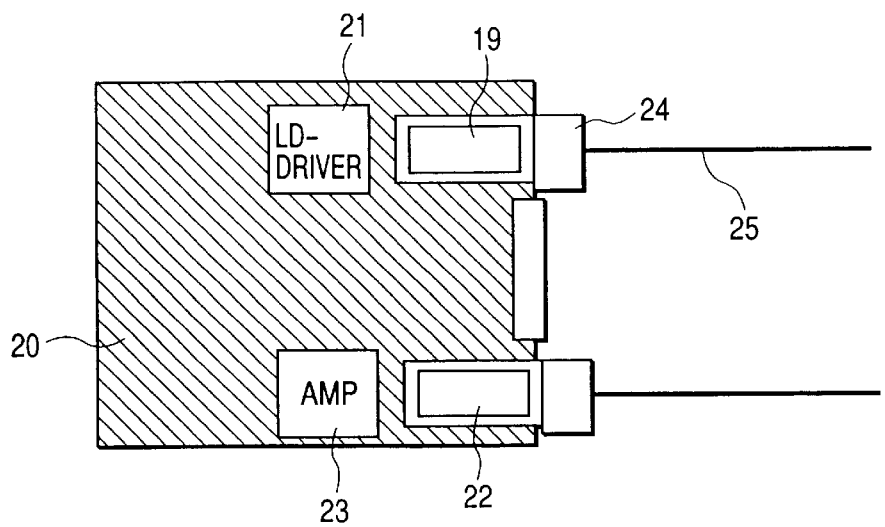
FIGS. 9A and 9B are plan and cross-sectional views of an optical module of an embodiment in accordance with the present invention provided with detachable fiber pigtails and mounted on a circuit board, respectively.
Figure 9B:
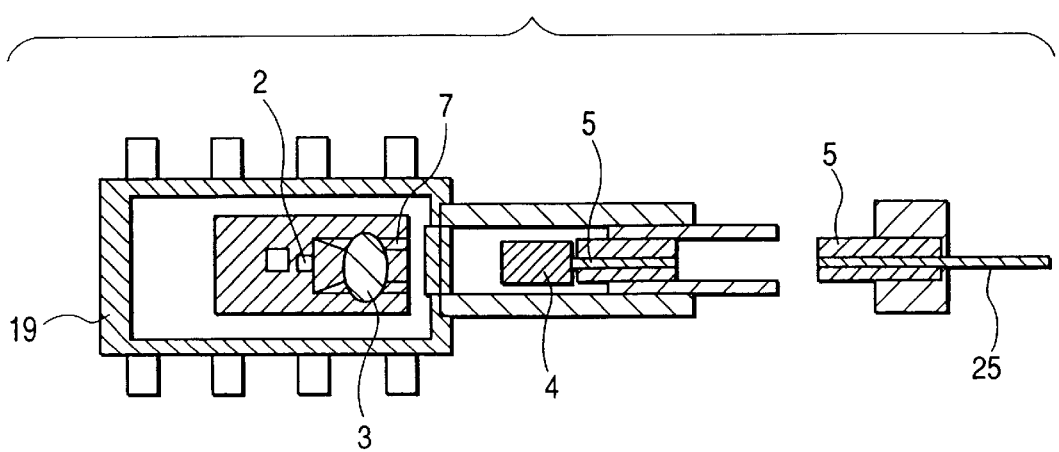

FIGS. 9A and 9B are plan and cross-sectional views of an optical module of a seventh embodiment in accordance with the present invention. The optical module 19 is a package of the type detachably coupling an optical fiber 25 thereto. The optical fiber 25 is detachably coupled by an optical connector 24.

This construction eliminates the need for routing of a fiber pigtail and enables automation of soldering by a reflow-at-one-time method in the manufacture of the optical module.

Figure 10:
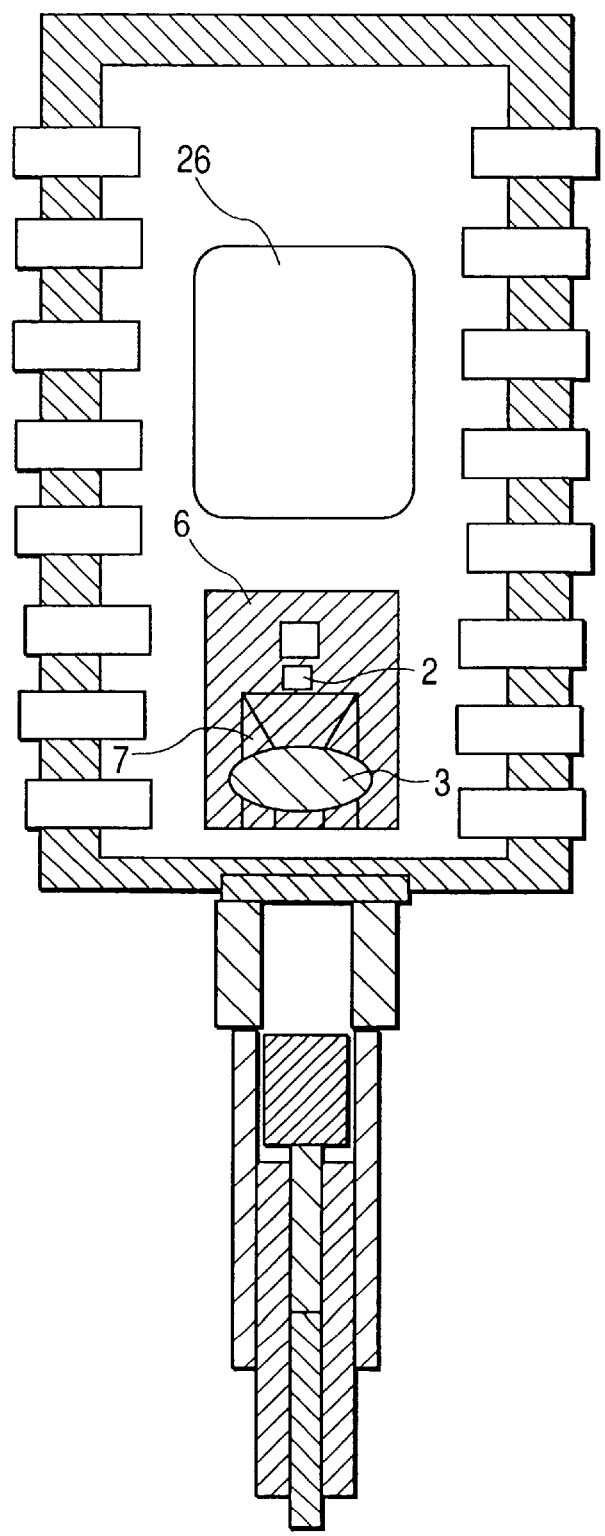
FIG. 10 is a plan view of a sub-assembly of an embodiment in accordance with the present invention mounted in a package together with a laser element driver IC.

FIG. 10 is an illustration for explaining an eighth embodiment of the present invention. This embodiment mounts the above assemblies mounted on the Si substrate in the previous embodiments and various application specific integrated circuit, an driver IC 26, for example, in the same package to increase the packing density.

Figure 11:
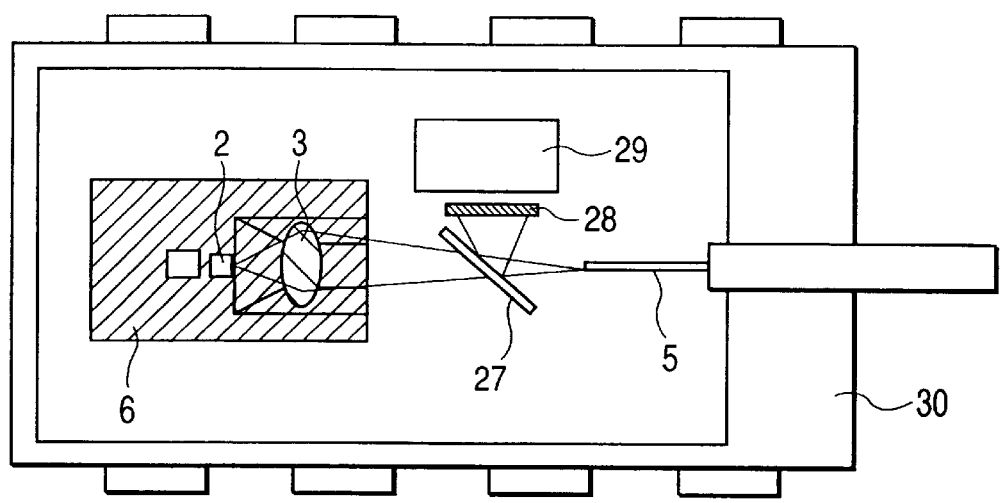
FIG. 11 is a plan view of a wavelength-division multiplexed module of an embodiment in accordance with the present invention employing the sub-assembly in accordance with the present invention using two different wavelengths of 1.3 $\mu$m and 1.5 $\mu$m.

FIG. 11 is a plan view of a wavelength-division multiplexed optical module of an embodiment in accordance with the invention. The 8-pin dual in-line type package 30 houses a block which mounts the semiconductor laser element 2 and the image-forming element 3 such as an aspherical lens on the Si substrate 6 formed with a V-groove. The light beam from the semiconductor laser element is coupled to the optical fiber 5. A wavelength-selective filter 27 is disposed between the image-forming element 3 and the optical fiber 5 such that the light from the semiconductor laser element pass through the filter 27, the optical signal is reflected by the filter 27 to the photo detector 28 where the optical signal is converted into an electrical signal, and the electrical signal is amplified by the amplifier 29. This embodiment integrates a transmitter and a receiver into a single optical module.

According to the standardizing conference for access network in FSAN (Full Services Access Network Systems), the wavelength for the semiconductor laser element on the subscriber side is 1.3 μm, the wavelength for the photo detector on the subscriber side is 1.5 μm; the wavelength for the semiconductor laser element on the station side is 1.5 μm, and the wavelength for the photo detector on the station side is 1.3 μm. This embodiment satisfies these specifications.

The embodiments of the present invention features integration of the optical system having high optical coupling efficiency on the Si substrate together with the semiconductor laser element.

Figure 12:
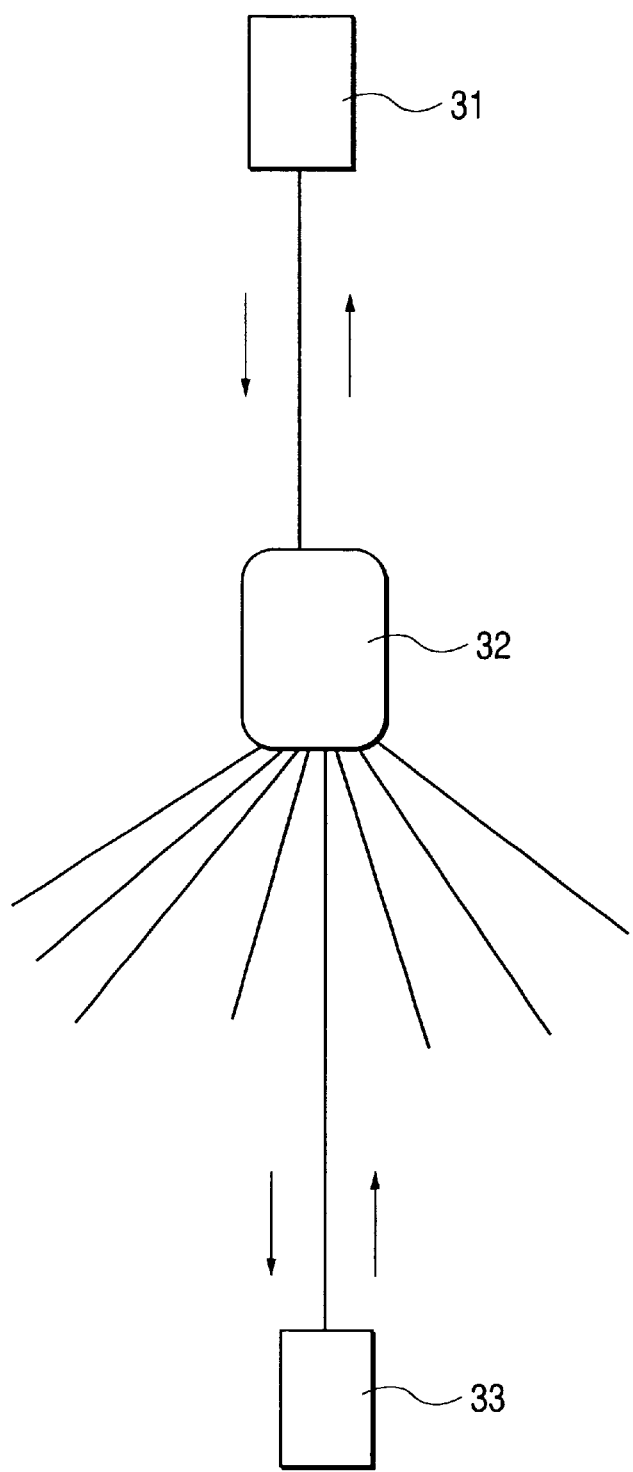
FIG. 12 is an illustration of the arrangement of an optical module of an embodiment in accordance with the present invention and a passive star for access network.

Suppose an optical signal from the optical module 31 on the station side is distributed to N lines by a branching device 32 as illustrated in FIG. 12. If a high optical coupling efficiency is achieved in the optical system and the output of the optical fiber is doubled, this makes possible a distribution to 2N lines, the cost of the system can be shared by double the original number of subscribers, and consequently the cost would be greatly reduced.

Generally in single-mode optical transmission, when an optical signal from the optical module 33 on the subscriber side is transmitted to the optical module 31 on the station side, the optical output is reduced to one Nth when the optical signal passes through the branching device for distributing to N lines. Consequently, the high optical coupling efficiency is required of the optical module 33 on the subscriber side, and the optical system of the present invention provides great advantages.

Figure 13A:
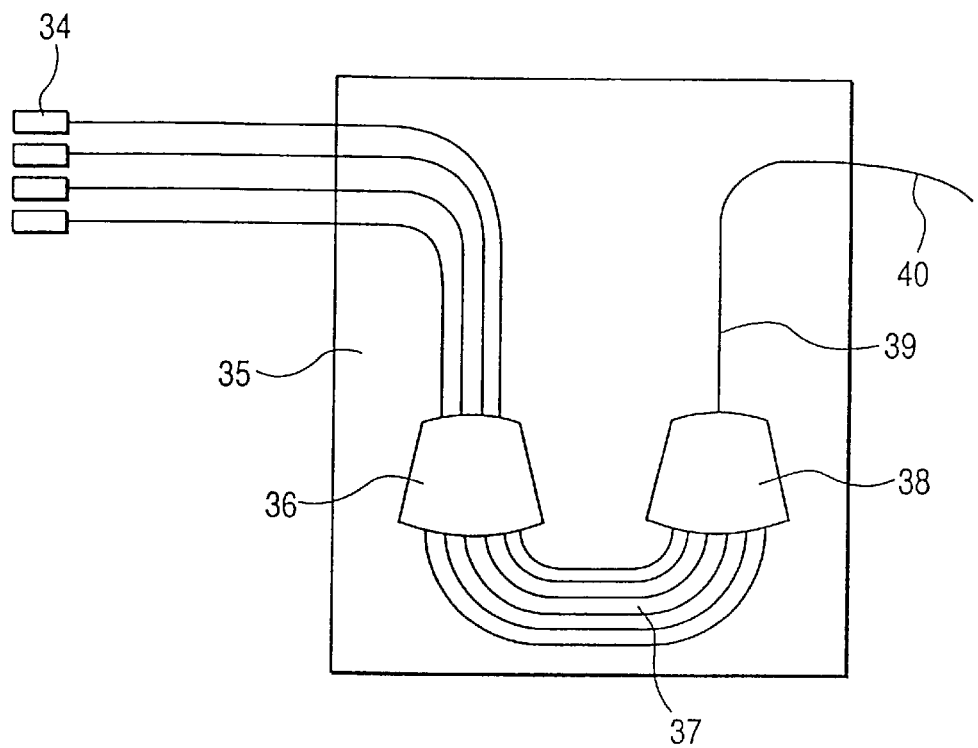
FIGS. 13A and 13B are illustrations of the arrangement of an optical module of an embodiment in accordance with the present invention, a waveguide array and a wavelength-division multiplexing filter configured to achieve dense wavelength-division multiplexing.
Figure 13B:
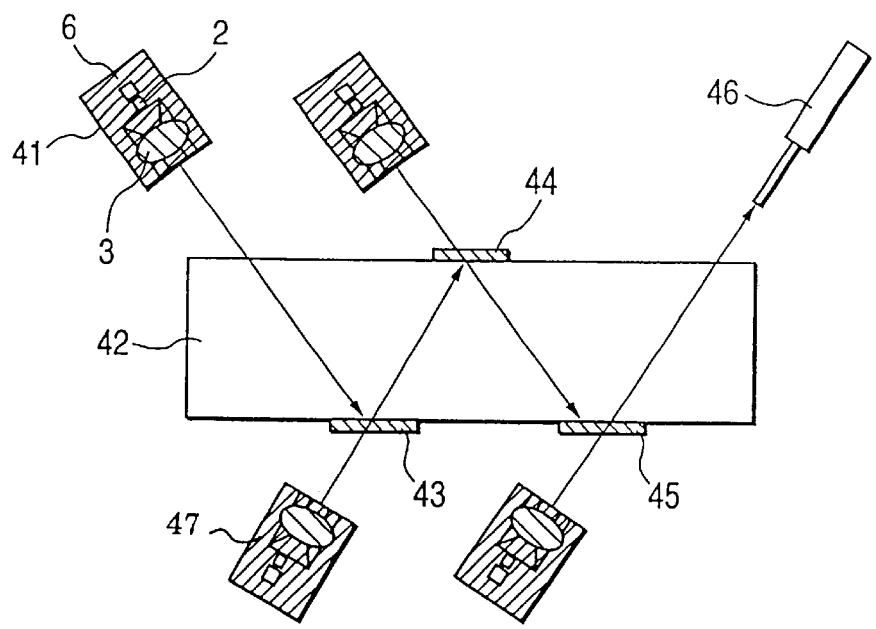

FIGS. 13A and 13B are illustrations of the arrangement of an optical module of an embodiment in accordance with the present invention, a waveguide array and a wavelength-division multiplexing filter configured to achieve dense wavelength-division multiplexing. A plurality of optical module 34 each having a semiconductor laser element are arranged such that a difference in wavelength between two adjacent semiconductor laser elements is small, the optical modules 34 are a wavelength-division multiplexer 35. In the optical multiplexer 35, a plurality of optical waveguides each having an optical path differing from each other are arranged in an array, the diffraction section 36 provides the incident lights to the succeeding optical guide array, and again the lights are provided to the optical waveguide array 37 with each optical waveguide having an optical path differing from each other. Next all the lights enter one optical waveguide 39 at the light collection section 38, are provided to the optical fiber 40, and are transmitted to the receiving optical module in the wavelength-division multiplexed state.

With this construction, many wavelength channels can be established in a single optical fiber and a large-capacity optical communication network can be established.

For example, suppose 2.5 Gbps can be transmitted by a single wavelength. If the number of wavelengths are increased to 16, 32 and 64, the amount of transmission are increased to 40, 80, 160 Gbps, respectively. Further, if 10 and 40 Gbps are achieved by a single wavelength, the wavelength-division multiplexing by a factor of 64 provides 640 Gbps and 2.56 Tbps.

FIG. 13B illustrates another embodiment. There are arranged a plurality of sub-assemblies 41 having a semiconductor laser element 2, an image-forming element 3 such as an aspherical and a Si substrate formed with a V-groove 6.

Each of the semiconductor laser elements has an oscillating wavelength differing from each other.

The laser light from the sub-assembly 41 enters the optical wavelength multiplexer 42, is reflected successively by the wavelength-selective filters 43, 44 and 45 and then is coupled to the optical fiber 46. The light from the sub-assembly 47 has a wavelength a little different from that of the laser light from the sub-assembly 41, therefore passes through the filter 43, then is reflected by the filters 44 and 45, and goes to the optical fiber 46. In this way the lights from the remaining sub-assemblies are also provided to the optical fiber 46 in the wavelength-division multiplexed state to achieve the above-mentioned large-capacity transmission channels.

Reception of the optical signals is carried out by performing the above procedure in the reverse order. The embodiments of the present invention provide optical communication equipment having high optical coupling efficiency.

What is claimed is:

1. An optical communication equipment comprising a semiconductor laser element, an image-forming element, an optical fiber and a substrate for mounting said semiconductor laser element, said image-forming element and said optical fiber, an optical output of; said semiconductor laser element being provided it said optical fiber via said image-forming element, wherein said image-forming element is mounted in a V-groove formed in said substrate and having a substantially "V"-shaped cross-section, a shortest distance between a light spot of said semiconductor laser element and an optical axis of said image-forming element is 1 mm at most and said image-forming element substantially satisfies a sine condition defined as m sin u'=sin u, where
- m is a paraxial lateral magnification of said image-forming element,
- u is an angle which an arbitrary ray leaving an object on said optical axis makes with respect to said optical axis, and
- u' is an angle which said arbitrary ray after passing through said image-forming element makes with respect to said optical axis.

2. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a diameter of said image-forming element is at least 10 microns, but 2 mm at most, a shortest distance between a light spot of said semiconductor laser element and an optical axis of said image-forming element is 2 mm at most in an object space of said image-forming element, and a maximum of wave front aberration in an image of said semiconductor laser element caused by said image-forming element is less than half an output wavelength of said semiconductor laser element.

3. An optical communication equipment according to claim 2, wherein an angle θ between a direction of a principal ray of an optical system comprised of said semiconductor laser element and said image-forming element and a direction of a principal ray of said optical fiber is in a range of $\theta_{1/10}$ to $\theta_{max}$, said $\theta_{max}$ being said angle θ at which an optical coupling efficiency between said semiconductor laser element and said optical fiber is a maximum thereof, and said $\theta_{1/10}$ being said angle θ at which said optical coupling efficiency is one tenth of said maximum.

4. An optical communication equipment according to claim 2, wherein said light spot is in a plane parallel with a major surface of said substrate mounting said image-forming element therein, is displaced in a direction vertical with respect to said optical axis of said image-forming element such that an optical axis of an optical system comprised of said semiconductor laser element and an image point formed by said image-forming element intersects said optical axis of said image-forming element at an angle θA (θA≠0).

5. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a shortest distance between a light spot of said semiconductor laser element and an optical axis of said image-forming element is 1 mm at most, a numerical aperture of said image-forming element on a side thereof facing said semiconductor laser element is approximately equal to a numerical aperture of said semiconductor laser element and a numerical aperture of said image-forming element on a side thereof facing said optical fiber is approximately equal to a numerical aperture of said optical fiber, when said numerical aperture is defined as n sin α, n being a refractive index and α being a beam divergence angle.

6. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a shortest distance between a light spot of said semiconductor laser element and an optical axis of said image-forming element is 1 mm at most, and an angle θ between a direction of a principal ray of an optical system comprised of said semiconductor laser element and said image-forming element and a direction of a principal ray of said optical fiber is in a range of $\theta_{1/10}$ to $\theta_{max}$, said $\theta_{max}$ being said angle θ at which an optical coupling efficiency between said semiconductor laser element and said optical fiber is a maximum thereof, and said $\theta_{1/10}$ being said angle θ at which said optical coupling efficiency is one tenth of said maximum.

7. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a shortest distance between a light spot of said semiconductor laser element and an optical axis of said image-forming element is 1 mm at most, a numerical aperture of said image-forming element on a side thereof facing said semiconductor laser element is approximately equal to a numerical aperture of said semiconductor laser element and a numerical aperture of said image-forming element on a side thereof facing said optical fiber is approximately equal to a numerical aperture of said optical fiber, when said numerical aperture is defined as n sin α, n being a refractive index and α being a beam divergence angle, and an angle θ between a direction of a principal ray of an optical system comprised of said semiconductor laser element and said image-forming element and a direction of a principal ray of said optical fiber is in a range of $\theta_{1/10}$ to $\theta_{max}$, said $\theta_{max}$ being said angle θ at which an optical coupling efficiency between said semiconductor laser element and said optical fiber is a maximum thereof, and said $\theta_{1/10}$ being said angle θ at which said optical coupling efficiency is one tenth of said maximum.

8. An optical communication equipment according to claim 7, wherein said light spot is in a plane parallel with a major surface of said substrate mounting said image-forming element therein, is displaced in a direction vertical with respect to said optical axis of said image-forming element such that an optical axis of an optical system comprised of said semiconductor laser element and an image point formed by said image-forming element intersects said optical axis of said image-forming element at an angle θA (θA≠0).

9. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, and a light spot of said semiconductor laser element is in a plane parallel with a major surface of said substrate mounting said image-forming element therein, is displaced in a direction vertical with respect to said optical axis of said image-forming element such that an optical axis of an optical system comprised of said semiconductor laser element and an image point formed by said image-forming element intersects said optical axis of said image-forming element at an angle θA (θA≠0).

10. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a diameter of said image-forming element is at least 10 microns, but 2 mm at most, a shortest distance between a light spot of said semiconductor laser element and an optical axis of said image-forming element is 2 mm at most in an object space of said image-forming element, and a maximum of wave aberration in an image of said semiconductor laser element caused by said image-forming element is less than half an output wavelength of said semiconductor laser element, and an optical axis formed by said semiconductor laser element and said image-forming element intersects a normal to an entrance end of an optical isolator disposed on an optical axis formed by said image-forming element and one end of said optical fiber, at a predetermined angle θ(θ≠0).

11. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a shortest distance between a light spot of said semiconductor laser element and an optical axis of said image-forming element is 1 mm at most, a numerical aperture of said image-forming element on a side thereof facing said semiconductor laser element is approximately equal to a numerical aperture of said semiconductor laser element and a numerical aperture of said image-forming element on a side thereof facing said optical fiber is approximately equal to a numerical aperture of said optical fiber, when said numerical aperture is defined as n sin α, n being a refractive index and α being a beam divergence angle, and an optical axis formed by said semiconductor laser element and said image-forming element intersects a normal to an entrance end of an optical isolator disposed on an optical axis formed by said image-forming element and one end of said optical fiber, at a predetermined angle θ(θ≠0).

12. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a shortest distance between a light spot of said semiconductor laser element and an optical axis of said image-forming element is 1 mm at most, and an optical axis of said image-forming element intersects a normal to an entrance end of an optical isolator which laser light from said semiconductor laser element enters at an acute angle θ, said optical isolator being disposed on an optical axis formed by said image-forming element and one end of said optical fiber.

13. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a diameter of said image-forming element is at least 10 microns, but 2 mm at most, a shortest distance between a light spot of said semiconductor laser element and an optical axis of said image-forming element is 2 mm at most in an object space of said image-forming element, and a maximum of wave aberration in an image of said semiconductor laser element caused by said image-forming element is less than half an output wavelength of said semiconductor laser element, and an optical axis of said image-forming element intersects a normal to an entrance end of an optical isolator which laser light from said semiconductor laser element enters at an acute angle θ, said optical isolator being disposed on an optical axis formed by said image-forming element and one end of said optical fiber.

14. An optical communication equipment comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a shortest distance between a light spot of said semiconductor laser element and an optical axis of said image-forming element is 1 mm at most, a numerical aperture of said image-forming element on a side thereof facing said semiconductor laser element is approximately equal to a numerical aperture of said semiconductor laser element and a numerical aperture of said image-forming element on a side thereof facing said optical fiber is approximately equal to a numerical aperture of said optical fiber, when said numerical aperture is defined as n sin α, n being a refractive index and α being a beam divergence angle, and an optical axis of said image-forming element intersects a normal to an entrance end of an optical isolator which laser light from said semiconductor laser element enters at an acute angle θ, said optical isolator being disposed on an optical axis formed by said image-forming element and one end of said optical fiber.

15. An optical communication equipment according to claim 1, wherein said semiconductor laser element, said image-forming element and said substrate are housed in a dual in-line type package.

16. An optical communication equipment according to claim 10, wherein said semiconductor laser element, said image-forming element, said optical isolator and said substrate are mounted in a dual in-line type package.

17. An optical communication equipment according to claim 15, wherein said optical fiber is detachably coupled to said dual in-line type package.

18. An optical communication equipment according to claim 2, wherein said image-forming element substantially satisfies a sine condition defined as m sin u'=sin u, where m is a paraxial lateral magnification of said image-forming element, u is an angle which an arbitrary ray leaving an object on said optical axis makes with respect to said optical axis, and u' is an angle which said arbitrary ray after passing through said image-forming element makes with respect to said optical axis.

19. An optical communication equipment comprising:

a first image-forming element for image-forming and providing light emitted from a first optical fiber to at least one of optical elements including an optical modulator, an optical amplifier, an optical switch, an optical detector, an optical device for wavelength-division multiplexing and an optical element for add and drop, a second image-forming element for collecting and providing light emitted from said at least one of optical elements to a second optical fiber, and a substrate for mounting said first and second image-forming elements in respective V-grooves formed therein and having a substantially "V"-shaped cross-section, wherein said first and second image-forming elements substantially satisfy a sine condition defined as m sin u'=sin u, where m is a paraxial lateral magnification of a respective one of said first and second image-forming elements, u is an angle which an arbitrary ray leaving an object on an optical axis of said respective one of said first and second image forming elements makes with respect to said optical axis, and u' is an angle which said arbitrary ray after passing through said respective one of said first and second image-forming elements makes with respect to said optical axis.

20. A network equipment comprising:

a plurality of optical modules each including (1) an assembly comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, and a shortest distance between a light spot of said semiconductor laser element and an optical axis of, said image-forming element is 1 mm at most and said image-forming elements substantially satisfy a sine condition defined as m sin u'=sin u, where m is a paraxial lateral magnification of said image-forming element, u is an angle which an arbitrary ray leaving an object on said optical axis makes with respect to said optical axis, and u' is an angle which said arbitrary ray after passing through said image-forming element makes with respect to said optical axis, (2) a photodetector, (3) filters for wavelength-division multiplexing and demultiplexing, said plurality of optical modules being installed in at least one station and in a plurality of subscribers thereto, and a distributor coupled between at least one of said plurality of optical modules installed in said at least one station and said plurality of optical modules installed in said plurality of subscribers for distributing a signal, wherein said optical output of said semiconductor laser element incorporated in said at least one of said plurality of optical modules installed in said at least one station has a wavelength $\lambda_1$ different from a wavelength $\lambda_2$ of said optical output of said semiconductor laser elements incorporated in said plurality of optical modules installed in said plurality of subscribers such that two-way communication is made possible between said optical modules installed in said at least one station and in said plurality of subscribers.

21. A network equipment comprising:

a plurality of optical modules each including (1) an assembly comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a diameter of said image-forming element is at least 10 microns, but 2 mm at most, a shortest distance between a light spot of said semiconductor laser element and an optical axis of said image-forming element is 2 mm at most in an object space of said image-forming element, and a maximum of wave aberration in an image of said semiconductor laser element caused by said image-forming element is less than half an output wavelength of said semiconductor laser element, and said image-forming elements substantially satisfy a sine condition defined as m sin u'=sin u, where m is a paraxial lateral magnification of said image-forming element, u is an angle which an arbitrary ray leaving an object on said optical axis makes with respect to said optical axis, and u' is an angle which said arbitrary ray after passing through said image-forming element makes with respect to said optical axis, (2) a photodetector,
(3) filters for wavelength-division multiplexing and demultiplexing, said plurality of optical modules being installed in at least one station and in a plurality of subscribers thereto, and a distributor coupled between at least one of said plurality of optical modules installed in said at least one station and said plurality of optical modules installed in said plurality of subscribers for distributing a signal, wherein said optical output of said semiconductor laser element incorporated in said at least one of said plurality of optical modules installed in said at least one station has a wavelength $\lambda_1$ different from a wavelength $\lambda_2$ of said optical output of said semiconductor laser elements incorporated in said plurality of optical modules installed in said plurality of subscribers such that two-way communication is made possible between said optical modules installed in said at least one station and in said plurality of subscribers.

22. A network equipment comprising:

a plurality of optical modules each including
(1) an assembly comprising a semiconductor laser element, an image-forming element, an optical fiber and a substrate for mounting said semiconductor laser element, said image-forming element and said optical fiber, an optical output of said semiconductor laser element being provided to said optical fiber via said image-forming element, wherein said image-forming element is mounted in a V-groove formed in said substrate and having a substantially "V"-shaped cross-section, a shortest distance between a light spot of said semiconductor laser element and an optical axis of said image-forming element is 1 mm at most, a numerical aperture of said image-forming element on a side thereof facing said semiconductor laser element is approximately equal to a numerical aperture of said semiconductor laser element and a numerical aperture of said image-forming element on a side thereof facing said optical fiber is approximately equal to a numerical aperture of said optical fiber, when said numerical aperture is defined as n sin α, n being a refractive index and α being a beam divergence angle, and said image-forming elements substantially satisfy a sine condition defined as m sin u'=sin u, where m is a paraxial lateral magnification of said image-forming element, u is an angle which an arbitrary ray leaving an object on said optical axis makes with respect to said optical axis, and u' is an angle which said arbitrary ray after passing through said image-forming element makes with respect to said optical axis, (2) a photodetector,
(3) filters for wavelength-division multiplexing and demultiplexing, said plurality of optical modules being installed in at least one station and in a plurality of subscribers thereto, and a distributor coupled between at least one of said plurality of optical modules installed in said at least one station and said plurality of optical modules installed in said plurality of subscribers for distributing a signal, wherein said optical output of said semiconductor laser element incorporated in said at least one of said plurality of optical modules installed in said at least one station has a wavelength $\lambda_1$ different from a wavelength $\lambda_2$ of said optical output of said semiconductor laser elements incorporated in said plurality of optical modules installed in said plurality of subscribers such that two-way communication is made possible between said optical modules installed in said at least one station and in said plurality of subscribers.

23. An optical communication equipment according to claim 19, wherein said image-forming elements substantially satisfy the sine condition.

24. An optical communication equipment comprising first and second assemblies each comprising a semiconductor laser element, an image-forming element and a substrate for mounting said semiconductor laser element and said image-forming element, an optical output of said semiconductor laser element being provided to an optical fiber via said image-forming element, said image-forming element being mounted in a V-groove formed in said substrate and having a substantially "V"-shaped cross-section, a shortest distance between a light spot of said semiconductor laser element and an optical axis of said image-forming element being 1 mm at most, wherein a first semiconductor laser element incorporated in said first assembly provides a first output having a wavelength $\lambda_1$, a second semiconductor laser element incorporated in said second assembly provides a second output having a wavelength $\lambda_2$ different from said wavelength $\lambda_1$, said first and second outputs are provided to a wavelength-division multiplexer via said first and second image-forming elements, respectively, and multiplexed signals are provided to the optical fiber.

25. An optical communication equipment comprising first and second assemblies each comprising a semiconductor laser element, an image-forming element and a substrate for mounting said semiconductor laser element and said image-forming element, an optical output of said semiconductor laser element being provided to an optical fiber via said image-forming element, said image-forming element being mounted in a V-groove formed in said substrate and having a substantially "V"-shaped cross-section, a diameter of said image-forming element is at least 10 microns, but 2 mm at most, a shortest distance between a light spot of said semiconductor laser element and an optical axis of said image-forming element is 2 mm at most in an object space of said image-forming element, and a maximum of wave aberration in an image of said semiconductor laser element caused by said image-forming element is less than half an output wavelength of said semiconductor laser element, wherein a first semiconductor laser element incorporated in said first assembly provides a first output having a wavelength $\lambda_1$, a second semiconductor laser element incorporated in said second assembly provides a second output having a wavelength $\lambda_2$ different from said wavelength $\lambda_1$, said first and second outputs are provided to a wavelength-division multiplexer via said first and second image-forming elements, respectively, and multiplexed signals are provided to the optical fiber.

26. An optical communication equipment comprising first and second assemblies each comprising a semiconductor laser element, an image-forming element and a substrate for mounting said semiconductor laser element and said image-forming element, an optical output of said semiconductor laser element being provided to an optical fiber via said image-forming element, said image-forming element being mounted in a V-groove formed in said substrate and having a substantially "V"-shaped cross-section, a shortest distance between a light spot of said semiconductor laser element and an optical axis of said image-forming element is 1 mm at most, a numerical aperture of said image-forming element on a side thereof facing said semiconductor laser element is approximately equal to a numerical aperture of said semiconductor laser element and a numerical aperture of said image-forming element on a side thereof facing said optical fiber is approximately equal to a numerical aperture of said optical fiber, when said numerical aperture is defined as n sin α, n being a refractive index and α being a beam divergence angle, wherein a first semiconductor laser element incorporated in said first assembly provides a first output having a wavelength $\lambda_1$, a second semiconductor laser element incorporated in said second assembly provides a second output having a wavelength $\lambda_2$ different from said wavelength $\lambda_1$, said first and second outputs are provided to a wavelength-division multiplexer via said first and second image-forming elements, respectively, and multiplexed signals are provided to the optical fiber.

27. An optical communication equipment according to claim 24, wherein said first and second image-forming elements satisfy the sine condition.

\* \* \* \* \*